UNITED STATES PATENT OFFICE.

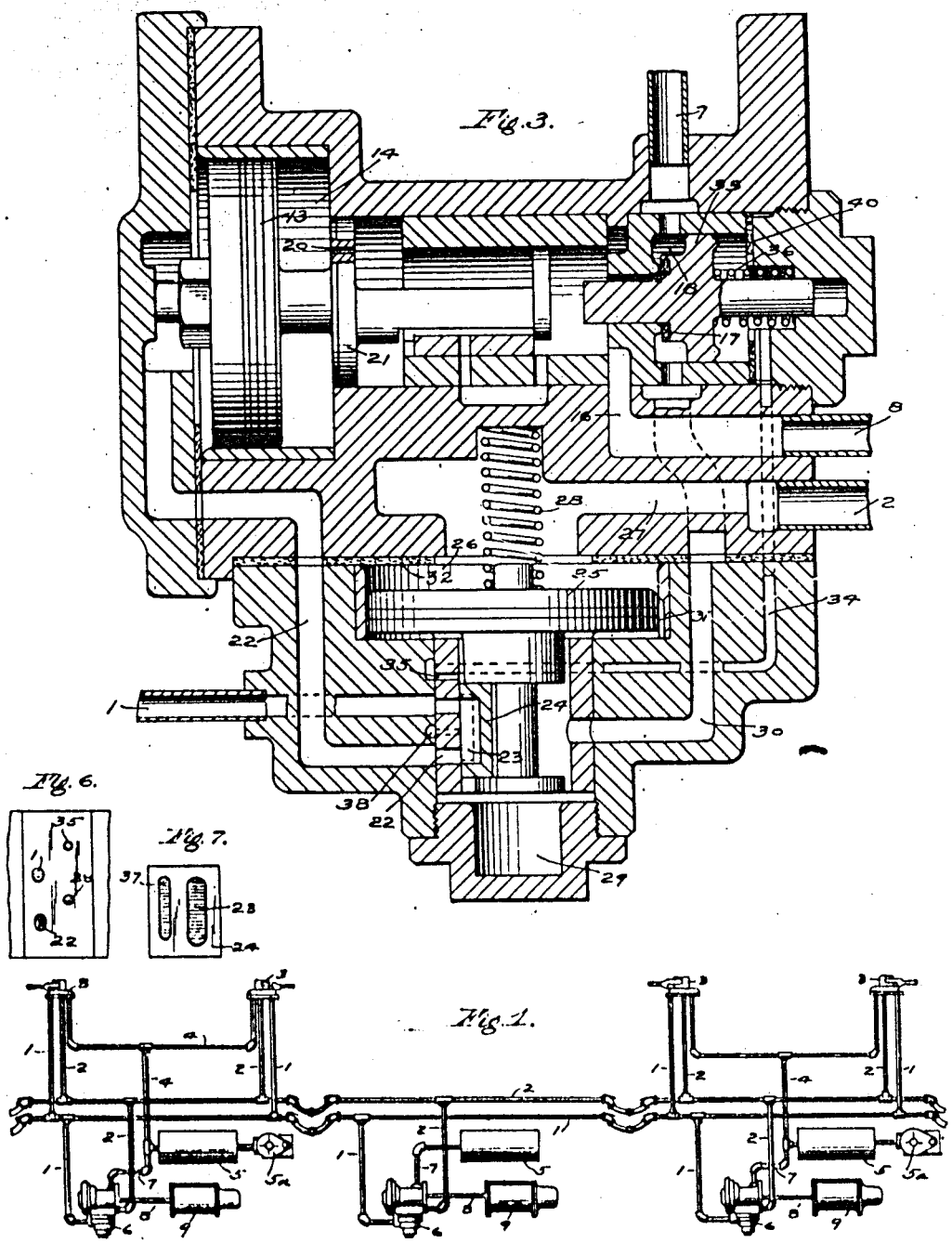

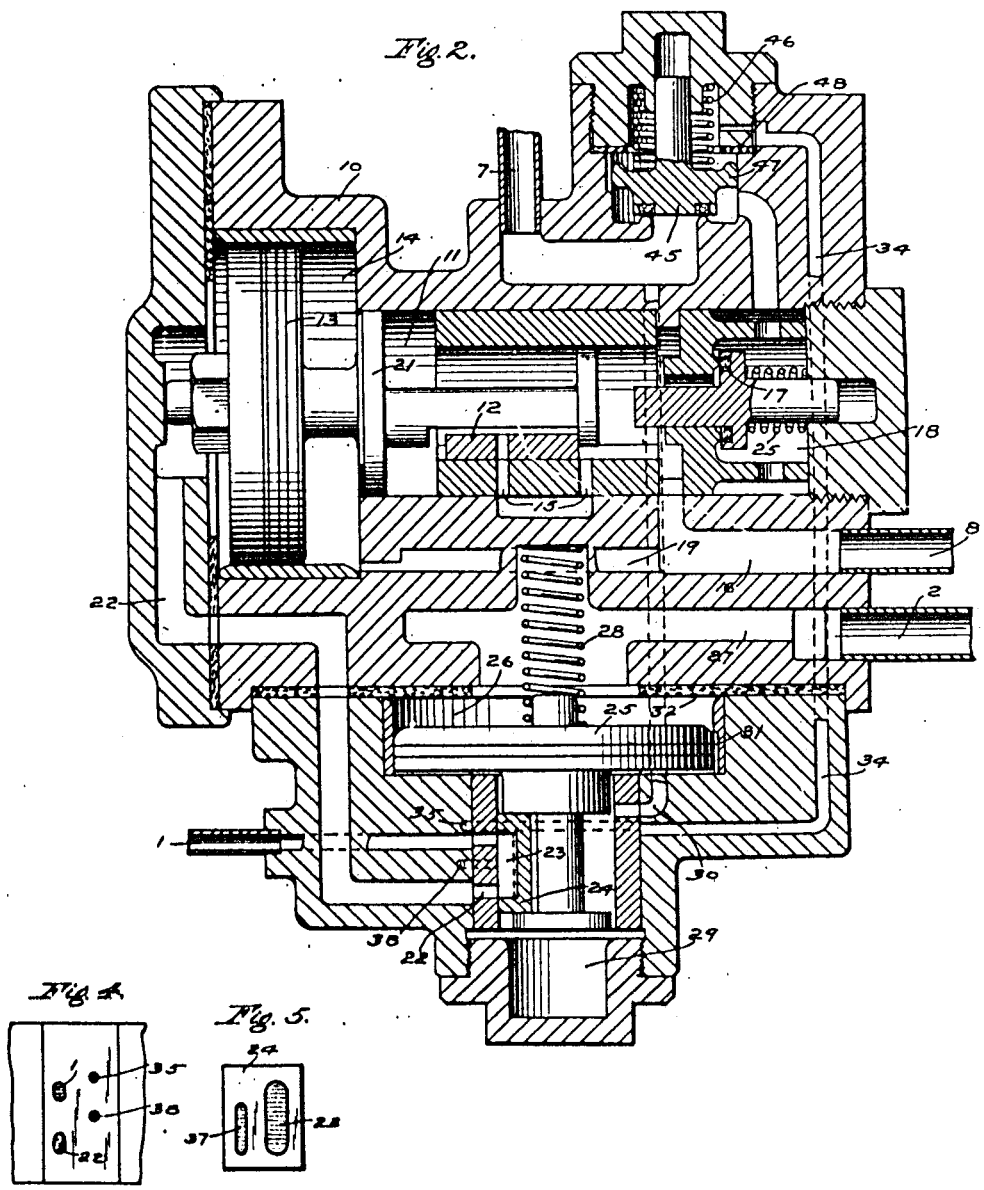

WALTER V. TURNER, OF EDGEWOOD, PENNSYLVANIA, ASSIGNOR TO THE WESTING-HOUSE AIR BRAKE COMPANY, OF PITTSBURGH, PENNSYLVANIA, A CORPORATION OF PENNSYLVANIA.

COMBINED AUTOMATIC EMERGENCY AND INDEPENDENT BRAKE APPARATUS.

1,057,509.   Specification of Letters Patent.   Patented Apr. 1, 1913.

Application filed April 25, 1907. Serial No. 370,193.

*To all whom it may concern:*

Be it known that I, WALTER V. TURNER, a citizen of the United States, residing at Edgewood, in the county of Allegheny and State of Pennsylvania, have invented new and useful Improvements in Combined Automatic Emergency and Independent Brake Apparatus, of which the following is a specification.
This invention relates to fluid pressure brakes, and more particularly to air brake systems adapted for electric traction service or passenger traffic on steam roads, in which cars are operated singly, or in trains of several cars coupled together.

It has heretofore been proposed to combine, with the so-called straight air equipment for normally operating the brakes, means adapted to automatically apply the brakes in an emergency, as when a flexible hose bursts, or in the case of a break-in-two of the train. This combination is desirable because of the flexibility, ease of manipulation and simplicity of the straight air equipment for normal operation and control of the brakes and of the necessity of also providing for automatic operation in emergencies. In prior constructions of this nature, fluid under pressure is supplied to and released from the brake cylinder through the straight air pipe by manipulation of the motorman's or engineer's brake valve, and by reason of the small capacity of the straight air pipe as compared with the capacity of a brake cylinder, it is manifest that the number of cars which may be successfully operated in this manner is limited, and in fact has been found unsatisfactory for use in connection with more than two or possibly three cars.

One of the objects of my present invention is, therefore, to provide an improved equipment adapted for service of the above-mentioned nature, which is adapted for application to trains of several cars, while retaining the flexibility, ease of manipulation and simplicity of the straight air brake system, and in which the speed of application and release of the brakes is considerably increased.
Another object is to compactly combine in a unitary structure the application and release valve mechanism with the emergency device, and still another object is to provide means for limiting the pressure of air admitted to the brake cylinder in service applications to a degree less than the maximum reservoir pressure and adapted in an emergency application of the brakes to supply a higher degree of pressure, such as the full equalized reservoir pressure to the brake cylinder.

In general, the invention comprises a reservoir supplied with compressed air either from an air pump connected to said reservoir on the same vehicle or through a pipe line from a source of supply on another vehicle, a valve mechanism operated by the fluid pressure in an independent line of train brake pipe for controlling the supply of fluid to the brake cylinder in service applications of the brakes, and means automatically operative upon a reduction in pressure in the automatic or emergency train brake pipe to supply fluid under pressure to said application valve mechanism and to cut off communication therefrom to the independent train pipe.

Another feature of the invention also contemplates the use of a single reservoir from which the application valve supplies fluid to the brake cylinder, and the pressure of which also operates upon the emergency valve device to supply fluid to actuate the application valve in emergency applications.

Another feature of the invention further comprises improved means for producing different maximum degrees of brake cylinder pressure in service and in emergency applications of the brakes.

In the accompanying drawings; Figure 1 is a diagrammatic view of an air brake equipment embodying my improvements and applied to a train of three cars; Fig. 2 a central sectional view of one form of distributing valve device, comprising an application and release valve mechanism and an emergency device, and showing the parts in normal release position; Fig. 3 a similar view of another slightly modified construction of the distributing valve device; Fig. 4 a plan view of the emergency valve seat, showing the location of ports in connection with Fig. 2; Fig. 5 a face view of the emergency valve; Fig. 6 a plan view of the emergency valve seat, showing the location of ports as applied to the construction shown in Fig. 3; and Fig. 7 a face view of the corresponding emergency valve.

Fig. 1 shows my invention as adapted to be applied to three cars, two motor cars and an intermediate trailer car, in which the air brake equipment comprises an independent brake pipe 1, automatic or emergency brake pipe 2, motorman's brake valve 3, reservoir pipe 4 connected to reservoir 5, air pump 5ª, distributing valve device 6 connected by pipe 7 to the reservoir 5 and by pipe 8 to brake cylinder 9.

The motorman's brake valve is adapted to control the supply of air from a reservoir 5, or other source of fluid pressure, to, and its release from, the independent brake pipe 1, which is connected with the distributing valve device 6. A preferred form of brake valve adapted for use as above indicated, is that shown and described in my prior application, Patent No. 882,918, granted March 24, 1908.

The construction of what may be termed the distributing valve is similar in some respects to that shown and described in my prior application, Serial No. 287527, filed Nov. 15, 1905, and according to the form illustrated in Fig. 2 of the drawings, comprises a valve casing 10 having a valve chamber 11 containing a slide valve 12, which is adapted to be actuated by a movable abutment 13 contained in a piston chamber 14. The slide valve 12 controls exhaust ports 15, which are open in release position of the parts, as shown in Fig. 2, to the valve chamber 11 and the brake cylinder, the valve chamber 11 being in free open communication with the brake cylinder through a passage 16. The supply of fluid under pressure to the brake cylinder is controlled by the movement of the abutment 13, which is adapted upon a sufficient inward movement to operate a puppet valve 17 controlling communication from a chamber 18, open to the reservoir 5 or other source of fluid pressure supply, through pipe 7, to the valve chamber 11 and brake cylinder. A light spring 25 tends to seat the valve 17. The abutment 13 is subject on its inner face to pressure in the brake cylinder, said abutment being in open communication with the brake cylinder through a passage 19 in the casing 10 or other communication, as an opening 20 through the piston guide 21, as shown in Fig. 3.

The independent brake pipe 1 is normally in communication with the outer face of the abutment 13 through a passage 22, which is connected thereto through a cavity 23 in an emergency valve 24.

When it is desired to make an application of the brakes, one of the brake valves 3 is operated to connect the fluid pressure supply pipe 4 with the independent brake pipe 1, so that fluid under pressure flows from the reservoir 5 through the independent brake pipe, cavity 23 in the emergency valve 24 and passage 22 to the abutment 13, which abutment is thereupon moved inwardly, closing the brake cylinder exhaust ports 15, and on further inward movement opening the valve 17, which admits fluid to the valve chamber 11 and the brake cylinder, until the brake cylinder pressure is equal to or slightly exceeds the independent brake pipe pressure, then the abutment 13 moves back and the admission valve 17 closes. It will thus be seen that the pressure in the brake cylinder may be increased according to the increase in the pressure in the independent brake pipe and may be released either wholly or partially by reducing the pressure therein correspondingly. It will also be noted that the brake cylinder pressure will be maintained in case of leakage of brake cylinder air, as the reduction of pressure on the inner face of the abutment 13 caused by such leakage permits the higher independent brake pipe pressure to move the abutment 13 and open the valve 17, thereby admitting fluid under pressure to the brake cylinder until the opposing pressures on the abutment are again equalized.

The automatic emergency valve device comprises a piston 25 contained in piston chamber 26, communicating through a passage 27 with the automatic or emergency train pipe 2 and a valve 24 contained in valve chamber 29 and adapted to be operated by the piston 25. Normally the piston 25 remains in its extreme inner position, in which the cavity 23 of the emergency valve 24 establishes communication between the independent brake pipe 1 and the passage 22 leading to the abutment 13, the piston being yieldingly retained in this position by a spring 28. A passage 30 establishes communication from the valve chamber 29 to the supply pipe 7, which is open to reservoir 5, so that the inner face of the emergency piston 25 is open to reservoir pressure. A feed groove 31 may be provided around piston 25, and if desired reservoir 5 may be charged from the automatic brake pipe 2 through said feed groove when the car is not supplied with its own air pump, as for example, in the case of a trailer car.

On a sudden reduction in automatic brake pipe pressure, as may be caused by a bursted hose, or the train breaking in two, the emergency piston 25 is moved by the superior reservoir pressure on its inner face and seats on the gasket 32, thereby shifting the valve 24, which thereupon cuts off communication between independent brake pipe 1 and the passage 22; at the same time the passage 22 is opened to the valve chamber 29, so that air from the reservoir 5 flows to the abutment 13, which thereupon moves the valve 12 to close the exhaust ports 15, and on further movement opens valve 17, admitting fluid under pressure to valve chamber 11, passage 16 and the brake cylinder.

It is very desirable to limit the brake cylinder pressure in service applications to a degree less than the maximum reservoir pressure, and one form of means for accomplishing this purpose is shown in Fig. 3. In this construction, the application valve 17 is operatively connected to a movable abutment or partition 33, which divides the chamber 18 into two compartments, the inner one of which is in open communication through pipe 7 with reservoir 5, and the other communicates through a passage 34 with a port 35, in the emergency valve seat, normally open to valve chamber 29, so that the fluid pressures on the application valve abutment 33 are normally balanced. The valve 17 is subject to the pressure of a spring 36 of such strength as to retain an excess pressure in the reservoir and to limit the pressure of air admitted through said valve to the brake cylinder to a certain amount less than the maximum reservior pressure. In service applications, therefore, the maximum pressure that may be admitted to the brake cylinder will not exceed the predetermined limit as defined by the spring 36.

In an emergency application the emergency piston 25 moves to its extreme outer position, in which the emergency valve 24 closes the independent brake pipe 1 and opens communication between the passage 22 and the valve chamber 29, as before described. The reservoir pressure actuates the abutment 13 and valve 12 to close the exhaust ports 16 and open the valve 17, thereby admitting fluid from the reservoir to the brake cylinder. The emergency valve 24 also has an additional cavity 37 which, in this position of the parts, connects the port 35 with an exhaust port 38, so that fluid under pressure is vented from the outer chamber of the abutment 33 to the atmosphere through the passage 34, and the reservoir pressure on the opposite face of the abutment 33 then moves the same to the extreme outer position, in which the abutment seats on the gasket 40, thereby holding application valve 17 wide open and allowing the full reservoir pressure to equalize into the brake cylinder.

In the construction just described, the admission or application valve 17 necessarily resists movement until the pressure of the spring 36 is overcome, so that in order to open the valve in service applications the independent brake pipe pressure must be correspondingly increased.

In the construction as shown in Fig. 2, the valve 17 is held to its seat by a light spring, so that said valve will readily open under a considerably lower degree of independent brake pipe pressure on the abutment 13. For this reason, I prefer to adopt the construction shown in Fig. 2, for limiting the brake cylinder pressure in service applications to an amount less than that of the full reservoir pressure, and for this purpose an excess pressure valve 45 may be arranged to control the passage of air from the pipe 7 and the reservoir to the application valve chamber 18, said valve being loaded by a spring 46 so adjusted as to limit the maximum degree of air pressure in the chamber 18 to the desired amount, hence limiting the maximum brake cylinder pressure in service applications to a corresponding degree. The valve 45 is connected with an abutment 47, the outer face of which is open to the passage 34 leading to the seat of the emergency valve 24. Normally, with this construction, the passage 34 is closed by said valve, but in an emergency application, when the piston 25 and emergency valve 24 move inwardly, cavity 37 in said valve connects the passage 34 to exhaust port 38, so that fluid under pressure is vented from the chamber above the reducing valve abutment 47; fluid pressure on the opposite face of the abutment will then overcome the resistance of the spring, moving the abutment 47 to seat on the gasket 48. The valve 45 is thus thrown wide open, so that air under full reservoir pressure is admitted to the chamber 18, and thence on opening of the application valve, as before described, to valve chamber 11 and the brake cylinder.

From the foregoing description it will now be seen that I have provided an improved brake system adapted to be applied to a train of several cars and having two lines of train pipe, the automatic or emergency train brake pipe normally carrying fluid under pressure and the independent train brake pipe normally at atmospheric pressure when brakes are released, each car being provided with a reservoir, an application valve mechanism governed by the pressure admitted to the independent train pipe for controlling the supply of fluid to the brake cylinder, and an automatic valve device operating upon a reduction in emergency pipe pressure to cut off said independent train pipe connection and to supply fluid under pressure to said application valve mechanism. It is further apparent that I have provided means whereby the pressure of air admitted to the brake cylinder in service applications may be limited to a desired degree less than maximum reservoir pressure while obtaining full reservoir pressure in emergency applications.

Having now described my invention, what I claim as new and desire to secure by Letters Patent, is:—

1. In a fluid pressure brake, the combination with a brake cylinder, independent train pipe, and emergency train pipe, of means governed by independent train pipe pressure for controlling the supply of air to the brake cylinder, and an automatic valve device having a piston normally subject to fluid under pressure upon its opposite sides and operated by a reduction in the emergency pipe pressure to close the independent train pipe connection and to supply air to said means.

2. In a fluid pressure brake the combination with a brake cylinder, an independent train pipe, and an emergency train pipe normally carrying air under pressure, of a valve mechanism having an abutment operated by the opposing pressure of the independent train pipe and the brake cylinder for controlling the supply of air to the brake cylinder, and an automatic valve device having a piston normally subject on its opposite sides to fluid under pressure and operating upon a reduction in the emergency pipe pressure to close communication from the independent pipe to said abutment and to supply air thereto.

3. In a fluid pressure brake the combination with a reservoir, a brake cylinder, an independent train pipe, and an emergency train pipe, of a valve mechanism governed by independent train pipe pressure for controlling the supply of air from the reservoir to the brake cylinder, and an automatic valve device having a piston subject to the opposing pressures of the reservoir and the emergency train pipe and operating upon a reduction in said emergency pipe pressure to close communication from the independent train pipe to said valve mechanism and to open communication from the reservoir to said valve mechanism.

4. In a fluid pressure brake the combination with a reservoir, a brake cylinder, an independent train pipe, and an emergency train pipe, of a valve mechanism having an abutment operated by the opposing pressures of the independent train pipe and the brake cylinder for controlling the supply of air to the brake cylinder, and an automatic valve device having a piston subject to the opposing pressures of the reservoir and the emergency train pipe for controlling communication from the independent train pipe to said abutment and from the reservoir to said abutment.

5. In a fluid pressure brake the combination with a reservoir, a brake cylinder, an independent train pipe, and an emergency train pipe, of a valve mechanism having an abutment operated by the opposing pressures of the independent train pipe and the brake cylinder for controlling the supply and release of air to and from the brake cylinder, and an automatic valve device having a piston subject to the opposing pressures of the reservoir and the emergency train pipe and operating under a reduction in said emergency pipe pressure to close communication from said abutment to the independent train pipe and open communication from the reservoir to said abutment.

6. In a fluid pressure brake the combination with a brake cylinder, an independent train pipe, and an emergency train pipe, of a valve mechanism governed by the independent train pipe pressure for controlling the supply of air to the brake cylinder, an automatic valve device normally establishing communication from the independent train pipe to said valve mechanism but operating upon a reduction in emergency pipe pressure to close said communication and to supply air to said valve mechanism, and a spring tending to hold said automatic valve device in its normal position.

7. In a fluid pressure brake the combination with a brake cylinder, an independent train pipe, and an emergency train pipe, of a valve mechanism governed by the pressure in the independent train pipe for controlling the supply of air to the brake cylinder, an automatic valve device normally establishing communication from the independent train pipe to said valve mechanism but operated by a reduction in emergency pipe pressure to close said communication and to supply air to said valve mechanism, and a manually operated valve for supplying air from a source of supply to the emergency train pipe for releasing after an emergency application.

8. In a fluid pressure brake the combination with a brake cylinder, an independent train pipe, and an emergency train pipe, of a valve mechanism governed by the pressure in the independent train pipe for controlling the supply of air to the brake cylinder, an automatic valve device normally establishing communication from the independent train pipe to said valve mechanism but operated by a reduction in emergency pipe pressure to close said communication and to supply air to said valve mechanism, and a manually operated valve having means for supplying air to and for releasing air from said emergency train pipe.

9. In a fluid pressure brake the combination with a reservoir, a brake cylinder, an independent train pipe, and an emergency train pipe, of a valve mechanism governed by the independent train pipe pressure for controlling the supply of air from the reservoir to the brake cylinder, a piston subject to the opposing pressures of the reservoir and the emergency train pipe, and means operated by the movement of said piston for controlling communication from the emergency pipe to the reservoir, from the independent train pipe to the valve mechanism, and from the reservoir to said valve mechanism.

10. In a fluid pressure brake the combination with a reservoir, a brake cylinder, an independent train pipe, and an emergency train pipe, of a valve mechanism governed by the independent train pipe pressure for controlling the supply of air from the reservoir to the brake cylinder, and an automatic valve device having a piston subject to the opposing pressures of the reservoir and the emergency train pipe for actuating the same, said valve device normally affording communication from the reservoir to the emergency train pipe and from the independent train pipe to said valve mechanism, but operated by a reduction in emergency pipe pressure to close both of said communications and to open communication from the reservoir to said valve mechanism.

11. In a fluid pressure brake the combination with a reservoir, a brake cylinder, an independent train pipe, and an emergency train pipe, of a valve mechanism governed by the independent train pipe pressure for controlling the supply of air to the brake cylinder, an automatic valve device operating upon a reduction in emergency train pipe pressure to supply air from the reservoir to said valve mechanism, and a manually operated valve for supplying air from the reservoir to said emergency train pipe.

12. In a fluid pressure brake the combination with a reservoir, a brake cylinder, an independent train pipe, and an emergency train pipe, of a valve mechanism governed by the independent train pipe pressure for controlling the supply of air from the reservoir to the brake cylinder, an automatic valve device operating upon a reduction in emergency pipe pressure to close communication from the independent train pipe to said valve mechanism and to open communication from said reservoir to the valve mechanism, and a manually operated valve for supplying air from the reservoir to said emergency train pipe.

13. In a fluid pressure brake the combination with a reservoir, a brake cylinder, an independent train pipe, and an emergency train pipe, of a valve mechanism governed by the independent train pipe pressure for controlling the supply of air from the reservoir to the brake cylinder, an automatic valve device operating upon a reduction in emergency pipe pressure to close communication from the independent train pipe to said valve mechanism and to open communication from said reservoir to the valve mechanism, and a manually operated valve for supplying air from the reservoir to said emergency train pipe and for releasing air from said emergency train pipe.

14. In a fluid pressure brake the combination with a reservoir, a brake cylinder, an independent train pipe, and an emergency train pipe, of a valve mechanism governed by the independent train pipe pressure for controlling the supply and release of air to and from the brake cylinder, an automatic valve device normally establishing communication from the independent train pipe to said valve mechanism, but operating under a reduction in emergency train pipe pressure to close such communication and to open communication from the reservoir to said valve mechanism, and a manually operated valve for supplying air from said reservoir to the emergency train pipe and to the independent train pipe.

15. In a fluid pressure brake the combination with a brake cylinder, an independent train pipe, and an emergency train pipe, of a valve mechanism governed by the independent train pipe pressure for controlling the supply of air to the brake cylinder, and an automatic valve device having a slide valve normally establishing communication from the independent train pipe to said valve mechanism and a piston operating upon a reduction in emergency pipe pressure to move said slide valve to cut off said communication and to supply air to said valve mechanism.

16. In a fluid pressure brake, the combination with a reservoir, an air pump connected thereto, an emergency train pipe line and means for normally establishing a restricted communication from the reservoir to said emergency pipe, of an independent train pipe, a brake cylinder, a valve mechanism governed by the independent train pipe pressure for controlling the supply of air from the reservoir to the brake cylinder, and an automatic valve device operated by a reduction in emergency pipe pressure to close said restricted communication and the passage from the independent train pipe to said valve mechanism and to open communication from the reservoir to said valve mechanism.

17. In a fluid pressure brake, the combination with a brake cylinder and a reservoir, of a valve for controlling the supply of air to the brake cylinder, a reducing valve for normally limiting the maximum pressure of air flowing through said valve, and means adapted in an emergency application of the brakes to maintain said reducing valve open and permit the free flow of air to the brake cylinder.

18. In a fluid pressure brake, the combination with a brake cylinder and a reservoir, of a valve for controlling the supply of air to the brake cylinder, a reducing valve device for normally limiting the maximum pressure of air flowing through said valve in service applications of the brakes, and means for operating said valve device in an emergency application of the brakes to permit the free flow of air to the brake cylinder.

19. In a fluid pressure brake, the combination with a brake cylinder and a source of fluid pressure supply, of a valve for controlling the fluid pressure supply to the brake cylinder, means subject to a spring for limiting the maximum pressure of fluid flowing through said valve, an abutment normally subject to opposing fluid pressures for controlling said means, and a valve device operative in an emergency application of the brakes for venting one side of said abutment.

20. In a fluid pressure brake, the combination with a brake cylinder, train pipe and reservoir, of a valve device through which air is supplied to the brake cylinder, a load normally acting on said valve to limit the pressure admitted to the brake cylinder in service applications to a degree less than the reservoir pressure, and means operating in emergency applications to cut said load out of action and thereby permit free flow of air to the brake cylinder.

21. In a fluid pressure brake, the combination with a brake cylinder, train pipe and reservoir, of a spring actuated valve subject to fluid pressure for limiting the degree of pressure admitted from the reservoir to the brake cylinder in service applications, and an emergency valve device operated by a reduction in train pipe pressure for varying the fluid pressure on said spring actuated valve.

22. In a fluid pressure brake, the combination with a brake cylinder and a source of fluid pressure supply, of a valve for supplying air to the brake cylinder, an actuating abutment therefor, a resistance device tending to seat said valve, a piston operatively connected to said valve and normally subject to opposing fluid pressures, and means, operative in an emergency application of the brakes, for venting fluid pressure from one side of said piston and thereby counteract the pressure of said resistance device.

23. In a fluid pressure brake, the combination with a train pipe and a source of fluid pressure supply, of a valve for supplying air to the brake cylinder, a spring device tending to seat said valve, an abutment operatively connected to said valve and normally subject to opposing fluid pressures, and an emergency valve device operative on a sudden reduction in train pipe pressure to open a vent from one side of said abutment.

24. In a fluid pressure brake, the combination with an automatic train pipe, reservoir, independent train pipe and brake cylinder, of a spring pressed valve for controlling the supply of air to the brake cylinder, a movable abutment subject to the independent train pipe pressure for operating said valve, a piston head subject to fluid pressure connected to said valve, and an emergency valve device operative under a sudden reduction in the automatic train pipe pressure to vary the pressure on said piston head.

25. In a fluid pressure brake, the combination with an automatic train pipe, reservoir, independent train pipe and brake cylinder, of a spring pressed valve for controlling the supply of air to the brake cylinder, a movable abutment subject to the independent train pipe pressure for operating said valve, a piston head subject to fluid pressure connected to said valve, and an emergency valve device operative under a sudden reduction in the automatic train pipe pressure to supply air to said movable abutment and to release air from one side of said piston head.

In testimony whereof I have hereunto set my hand.

WALTER V. TURNER.

Witnesses:
R. F. EMERY,
T. B. MACDONALD.